United States Patent
Kulkarni et al.

(10) Patent No.: US 9,166,999 B1
(45) Date of Patent: *Oct. 20, 2015

(54) SECURITY RISK AGGREGATION, ANALYSIS, AND ADAPTIVE CONTROL

(71) Applicant: FMR LLC, Boston, MA (US)

(72) Inventors: Rajandra Laxman Kulkarni, Burlington, MA (US); Chalam Peddada, Newton, MA (US)

(73) Assignee: FMR LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,062

(22) Filed: Feb. 23, 2015

Related U.S. Application Data

(63) Continuation-in-part of application No. 14/341,209, filed on Jul. 25, 2014, now Pat. No. 8,966,640.

(51) Int. Cl.
*G06F 12/14* (2006.01)
*H04L 29/06* (2006.01)

(52) U.S. Cl.
CPC .................................. *H04L 63/1433* (2013.01)

(58) Field of Classification Search
None
See application file for complete search history.

(56) References Cited

U.S. PATENT DOCUMENTS

| | | | |
|---|---|---|---|
| 8,201,257 B1 | 6/2012 | Andres et al. | |
| 8,544,098 B2 | 9/2013 | Gustave et al. | |
| 8,966,640 B1 * | 2/2015 | Peddada et al. | 726/25 |
| 2007/0101418 A1 * | 5/2007 | Wood et al. | 726/8 |
| 2008/0028470 A1 | 1/2008 | Remington et al. | |
| 2008/0255993 A1 * | 10/2008 | Blinbaum | 705/44 |
| 2009/0083695 A1 * | 3/2009 | Mir et al. | 717/104 |
| 2010/0125911 A1 | 5/2010 | Bhaskaran | |
| 2011/0167011 A1 | 7/2011 | Paltenghe et al. | |
| 2012/0030083 A1 * | 2/2012 | Newman et al. | 705/35 |

FOREIGN PATENT DOCUMENTS

WO 2008141327 A1 11/2008

OTHER PUBLICATIONS

Non-final Office action from related U.S. Appl. No. 14/341,209, dated Oct. 23, 2014 (15 pages).

* cited by examiner

*Primary Examiner* — Kaveh Abrishamkar
(74) *Attorney, Agent, or Firm* — Proskauer Rose LLP

(57) ABSTRACT

Methods and apparatuses, including computer program products, are described for transaction-based security risk aggregation and analysis. A server computing device receives security risk data elements from a plurality of data sources, the data elements corresponding to a transaction submitted by a remote computing device to the server computing device for execution. The server computing device aggregates the security risk data elements into a weighted risk matrix. The server computing device generates a risk score for the submitted transaction based upon the weighted risk matrix. The server computing device determines an internal environment risk factor and an external environment risk factor based upon environmental risk data received from the plurality of data sources. The server computing device adjusts the risk score for the submitted transaction based upon the internal environment risk factor and the external environment risk factor, and determines a disposition for the transaction based upon the adjusted risk score.

15 Claims, 7 Drawing Sheets

| Vulnerability | Weight (Points) | Threat | Weight (Points) | Risk | Risk Score |
|---|---|---|---|---|---|
| I/T Training 302c | 10 | Data Leaks | 5 | Reputation / Money Loss | 50 |
| Operating System Patching 302a | 8 | Virus / Malware 304a | 5 | Business Disruption | 40 ←306a |
| Anti-Virus Definitions | 8 | Virus / Malware | 5 | Business Disruption | 40 |
| Device Lock | 10 | Data Leaks | 6 | Reputation / Money Loss | 60 |
| Drive Encryption | 9 | Data Leaks | 8 | Reputation / Money Loss | 72 |
| Identity Theft S/W | 5 | Hacking | 5 | Business Disruption | 25 |
| Unauthorized S/W | 8 | Hacking | 6 | Legal / Copyright / Reputation Loss | 48 |
| Resource Sharing | 7 | Hacking | 5 | Legal / Copyright / Reputation Loss | 35 |
| Administrator Rights 302b | 10 | Hacking | 8 | Legal / Copyright / Reputation Loss | 80 |
| | | | | TOTAL: | 450 ←310 |

FIG. 3

SECURITY RISK AGGREGATION, ANALYSIS, AND ADAPTIVE CONTROL

RELATED APPLICATIONS

This application is a continuation-in-part of U.S. patent application Ser. No. 14/341,209, filed Jul. 25, 2014, the entirety of which is incorporated herein by reference.

FIELD OF THE INVENTION

This application relates generally to methods and apparatuses, including computer program products, for transaction-based security risk aggregation, analysis, and adaptive control.

BACKGROUND

Typical security risk tracking is based upon individual employee compliance with risk policies instituted by a company, which provides an incomplete and dated view of the security risks to the company. Also, employee compliance is often determined through use of disparate risk criteria without any investigation into the threat posed by such risks, the likelihood of such threats occurring, and the impact of such threats on the operations of the company. In addition, security risks are generally not evaluated from an organizational perspective to enable a company to understand the overall security health of its divisions, business units, and the like.

Further, the security risks associated with transactions submitted to a company's computing system do not consider the business-level context or execution priority of the transactions as it relates to the security risk of the transactions.

SUMMARY OF THE INVENTION

Therefore, what is needed are methods and systems to provide a flexible and detailed view of an organization's security risk profile based upon a variety of risk metrics that are aggregated into a transaction-based risk scoring paradigm. The methods and systems described herein provide the advantage of combining vulnerabilities, threats, and risks associated with device and user interaction to generate a multi-faceted risk profile and score for specific transactions submitted to the organization's computing system. The methods and systems described herein provide the advantage of allowing an organization to customize its risk profile based upon many different data points to provide robust and efficient security risk analysis and remediation.

The invention, in one aspect, features a computerized method for transaction-based security risk aggregation and analysis. A server computing device receives security risk data elements from a plurality of data sources, the security risk data elements corresponding to a transaction submitted by a remote computing device to the server computing device for execution. The server computing device aggregates the security risk data elements into a weighted risk matrix, and generates a risk score for the submitted transaction based upon the weighted risk matrix. The server computing device determines an internal environment risk factor and an external environment risk factor based upon environmental risk data received from the plurality of data sources, and adjusts the risk score for the submitted transaction based upon the internal environment risk factor and the external environment risk factor. The server computing device determines a disposition for the transaction based upon the adjusted risk score.

The invention, in another aspect, features a system for transaction-based security risk aggregation and analysis. The system includes a server computing device configured to receive security risk data elements from a plurality of data sources, the security risk data elements corresponding to a transaction submitted by a remote computing device to the server computing device for execution. The server computing device is configured to aggregate the security risk data elements into a weighted risk matrix and generate a risk score for the submitted transaction based upon the weighted risk matrix. The server computing device is configured to determine an internal environment risk factor and an external environment risk factor based upon environmental risk data received from the plurality of data sources and adjust the risk score for the submitted transaction based upon the internal environment risk factor and the external environment risk factor. The server computing device is configured to determine a disposition for the transaction based upon the adjusted risk score.

The invention, in another aspect, features a computer program product, tangibly embodied in a non-transitory computer readable storage device, for transaction-based security risk aggregation and analysis. The computer program product includes instructions operable to cause a server computing device to receive security risk data elements from a plurality of data sources, the security risk data elements corresponding to a transaction submitted by a remote computing device to the server computing device for execution. The computer program product includes instructions operable to cause the server computing device to aggregate the security risk data elements into a weighted risk matrix and generate a risk score for the submitted transaction based upon the weighted risk matrix. The computer program product includes instructions operable to cause the server computing device to determine an internal environment risk factor and an external environment risk factor based upon environmental risk data received from the plurality of data sources and adjust the risk score for the submitted transaction based upon the internal environment risk factor and the external environment risk factor. The computer program product includes instructions operable to cause the server computing device to determine a disposition for the transaction based upon the adjusted risk score.

Any of the above aspects can include one or more of the following features. In some embodiments, the internal environment risk factor is based upon a risk level of transaction activity within an enterprise computing system in which the server computing system is located. In some embodiments, the transaction activity includes abnormal communications from or to computing devices in the enterprise computing system, detection of unauthorized software within the enterprise computing system, or both.

In some embodiments, the external environment risk factor is based upon a risk level of activity that is external to an enterprise computing system in which the server computing device is located. In some embodiments, the external activity includes cyber attacks against other enterprise computing systems, fraudulent transactions submitted to other enterprise computing systems, data breaches experienced by other enterprise computing systems, or any combination thereof.

In some embodiments, the server computing device stores the security risk data elements, the internal environment factor, the external environment factor, and the adjusted risk score in a database, and uses the stored security risk data elements, the internal environment factor, the external environment factor, and the adjusted risk score to determine a disposition of a future transaction. In some embodiments, the disposition for the transaction includes transferring the transaction to a secondary authentication system. In some embodiments, the secondary authentication system requests authentication credentials from the remote computing device that submitted the transaction.

In some embodiments, the disposition of the transaction includes holding the transaction in a queue and transmitting a notification to another computing device requesting authorization for the transaction. In some embodiments, the server computing device compares the adjusted risk score against a predefined risk threshold and determines a disposition for the transaction based upon the comparison. In some embodiments, the server computing device analyzes historical risk data associated with the transaction if the adjusted risk score exceeds the predefined risk threshold and adjusts the predefined risk threshold based upon the historical risk data so that the adjusted risk score falls below the predefined risk threshold. In some embodiments, the server computing device requests authorization to override the predefined risk threshold from another computing device and adjusts the predefined risk threshold based upon the requested authorization so that the adjusted risk score falls below the predefined risk threshold.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is an exemplary depiction of a weighted risk matrix.

DETAILED DESCRIPTION

Figure 1:
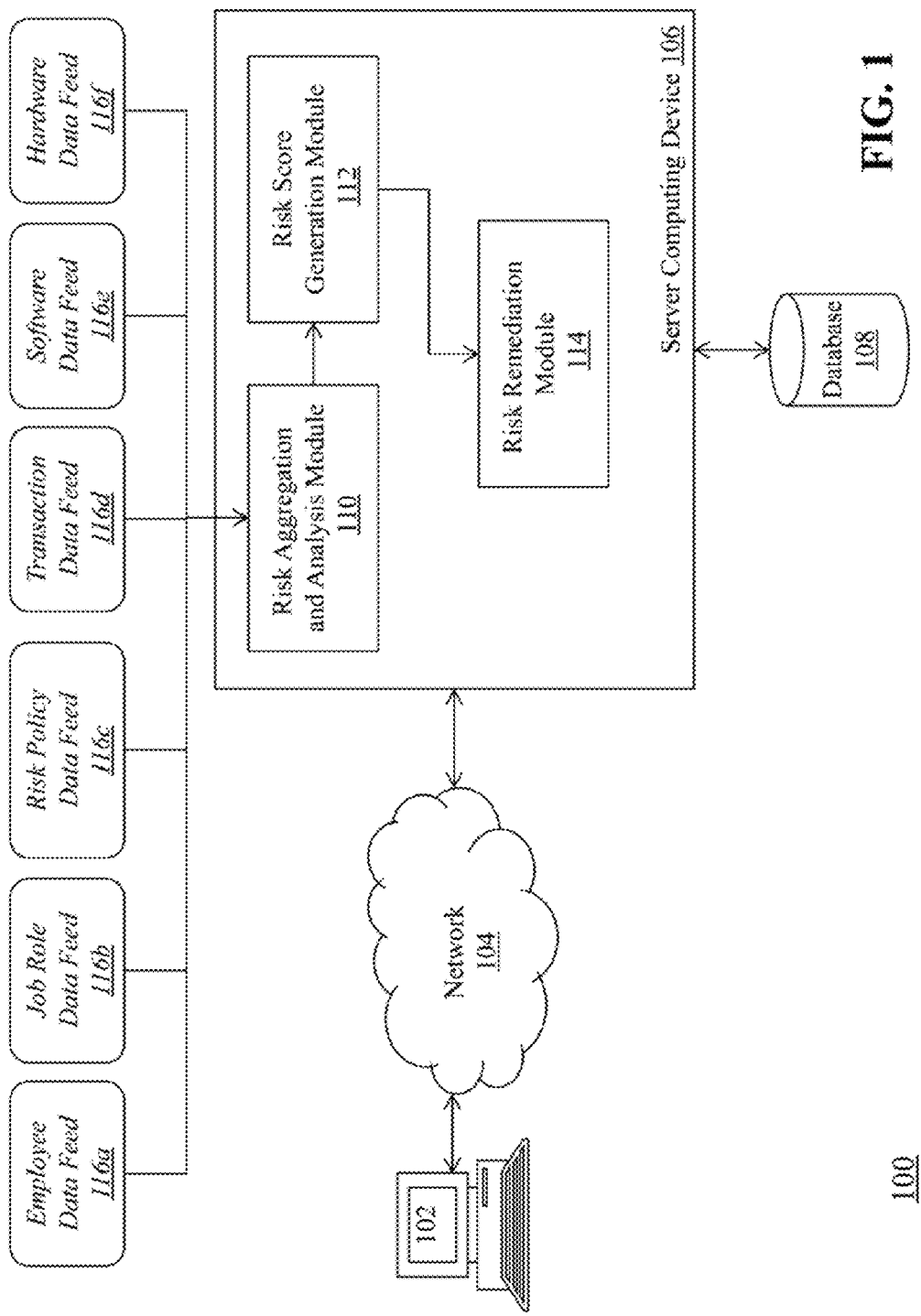
FIG. 1 is a block diagram of a system for transaction-based security risk aggregation and analysis.

FIG. 1 is a block diagram of a system 100 for transaction-based security risk aggregation and analysis, according to an embodiment of the invention. The system 100 includes a client device 102, a communications network 104, a server computing device 106 coupled to a database 108, several modules 110, 112, 114 included in the server computing device 106, and a plurality of data feeds 116a-116f connected to the server computing device 106.

The client device 102 connects to the server computing device 106 via the communications network 104. The client device 102 communicates with the server computing device as part of the transaction-based security risk aggregation and analysis process described herein (e.g., to receive results of the process from the server computing device 106 and/or to adjust parameters associated with the process). Exemplary client devices include desktop computers, laptop computers, tablets, mobile devices, smartphones, and internet appliances. It should be appreciated that other types of computing devices that are capable of connecting to the server computing device 106 can be used without departing from the scope of invention. Although FIG. 1 depicts a single client device 102, it should be appreciated that the system 100 can include any number of client devices.

The communication network 104 enables the client device 102 to communicate with the server computing device 106. The network 104 may be a local network, such as a LAN, or a wide area network, such as the Internet and/or a cellular network. In some embodiments, the network 104 is comprised of several discrete networks and/or sub-networks (e.g., cellular to Internet) that enable the client device 102 to communicate with the server computing device 106.

The server computing device 106 is a combination of hardware and software modules that perform the transaction-based security risk aggregation and analysis process and transmit the results of the transaction-based security risk aggregation and analysis process to remote computing devices (e.g., device 102). The server computing device 106 includes a risk aggregation and analysis module 110, a risk score generation module 112, and a risk remediation module 114. The modules 110, 112, 114 are hardware and/or software modules that reside on the server computing device 106 to perform functions associated with the transaction-based security risk aggregation and analysis process described herein. In some embodiments, the functionality of the modules 110, 112, 114 is distributed among a plurality of computing devices. It should be appreciated that any number of computing devices, arranged in a variety of architectures, resources, and configurations (e.g., cluster computing, virtual computing, cloud computing) can be used without departing from the scope of the invention. It should also be appreciated that, in some embodiments, the functionality of the modules 110, 112, 114 can be distributed such that any of the modules 110, 112, 114 are capable of performing any of the functions described herein without departing from the scope of the invention. For example, in some embodiments, the functionality of the modules 110, 112, 114 can be merged into a single module. The exemplary functionality of each module 110, 112, 114 will be described in greater detail below.

The system 100 also includes a database 108. The database 108 is coupled to the server computing device 106 and stores data used by the server computing device 106 to perform the transaction-based security risk aggregation and analysis functionality. The database 108 can be integrated with the server computing device 106 or be located on a separate computing device. An example database that can be used with the system 100 is MySQL™ available from Oracle Corp. of Redwood City, Calif.

The system also includes a plurality of data feeds 116a-116f that supply data to the server computing device 106 to be used in performing the transaction-based security risk aggregation and analysis process described herein. The data feeds 116a-116f can provide data to the server computing device according to any of a number of different schedules (e.g., real-time, daily, weekly, monthly, etc.) The data feeds 116a-116f depicted in FIG. 1 include an employee data feed 116a, a job role data feed 116b, a risk policy data feed 116c, a transaction data feed 116d, a software data feed 116e and a hardware data feed 116f. It should be appreciated that other types of data feeds can be coupled to the server computing device 106 without departing from the scope of invention. In addition, it should be understood that although a single data feed for each data feed type is depicted in FIG. 1, any of the above data feeds 116a-116f can comprise a plurality of separate or linked data feeds that make up the breadth of data provided to the server computing device 106 for a particular data feed type.

The employee data feed 116a provides data relating to individual employees of a company or organization, such as identity, job function, information access level, media access level, business unit, and the like. The job role data feed 116b provides data relating to the structure, configuration, and permission level of job roles within a company or organization. For example, the job role data feed 116b can provide data such as the hierarchy of job roles and/or titles within an organization, division, or a business unit, the information access level for a particular job role, the media access level for a particular job role, and the like. The employee data feed 116a can also provide information relating to the employee's level of compliance with certain standards imposed by the company—such as information technology policies, email policies, training requirements, ethics requirements, and the like.

The risk policy data feed 116c provides data relating to security risk policies implemented or defined by a company or organization. As will be described in greater detail below, a business can establish one or more risk policies that define a level of security risk associated with functions, operations, and/or transactions executed on the system 100. For example, a company may wish to assign a lower security risk level to certain transactions, such as transactions that may have a minimal impact on customer accounts, transactions performed by high-level executives within the business, or transactions that do not rely on sensitive information. On the other hand, the company may wish to assign a higher security risk level to certain transactions, such as significant monetary transactions (e.g., high-dollar trades) or transactions performed remotely by employees using computing devices that are not fully upgraded with the most current anti-virus software.

The transaction data feed 116d provides data relating to transactions that are submitted to a company's computing systems for execution. For example, a user at client device 102 may be an employee of a financial institution and submit a securities trade transaction to be processed by the financial institution. The transaction data feed 116d provides the trade details, such as the security being traded, the price of the trade, the seller, the buyer, a timestamp of the trade, and the like. It should be appreciated that, in the context of the methods and systems described herein, a transaction is not limited to a financial transaction (e.g., a trade), but other types of functions, operations, and transactions that are submitted to a company's computing systems for processing and/or execution. Examples of such functions, operations, and transactions include but are not limited to: financial transactions, information access requests, system access requests, software application access requests, information uploading/downloading, information storage requests, and information change requests. It should be understood that other types of computing transactions are contemplated to be within the scope of invention described herein.

The software data feed 116e provides data relating to the software on computing devices that access the company's system. For example, an employee at client device 102 may submit a request to access an information storage system within the company's network. The software data feed 116e provides information relating to, among others, the operating system, anti-virus software, security tool(s), application(s) resident on the device, application(s) being used to access the company's network, resource sharing, and other similar types of data based upon the client device 102. The software data feed 116e can also provide items such as version and patching information related to the software resident on the device 102.

The hardware data feed 116f provides data relating to the hardware of computing devices that access the company's system. For example, the hardware data feed 116f can provide attributes relating to the client device 102 hardware attempting to access the company's system—including items such as device type (e.g., mobile device, laptop, etc.), device identification (e.g., MAC address, device ID), network configuration (e.g., source IP address, network path), security data (e.g., encryption, authentication credentials), device location, device owner, and the like.

The data feeds 116a-116f transmit the information to the risk aggregation and analysis module 110 for use in the transaction-based security risk aggregation and analysis process, as will be described in greater detail below.

Figure 2:
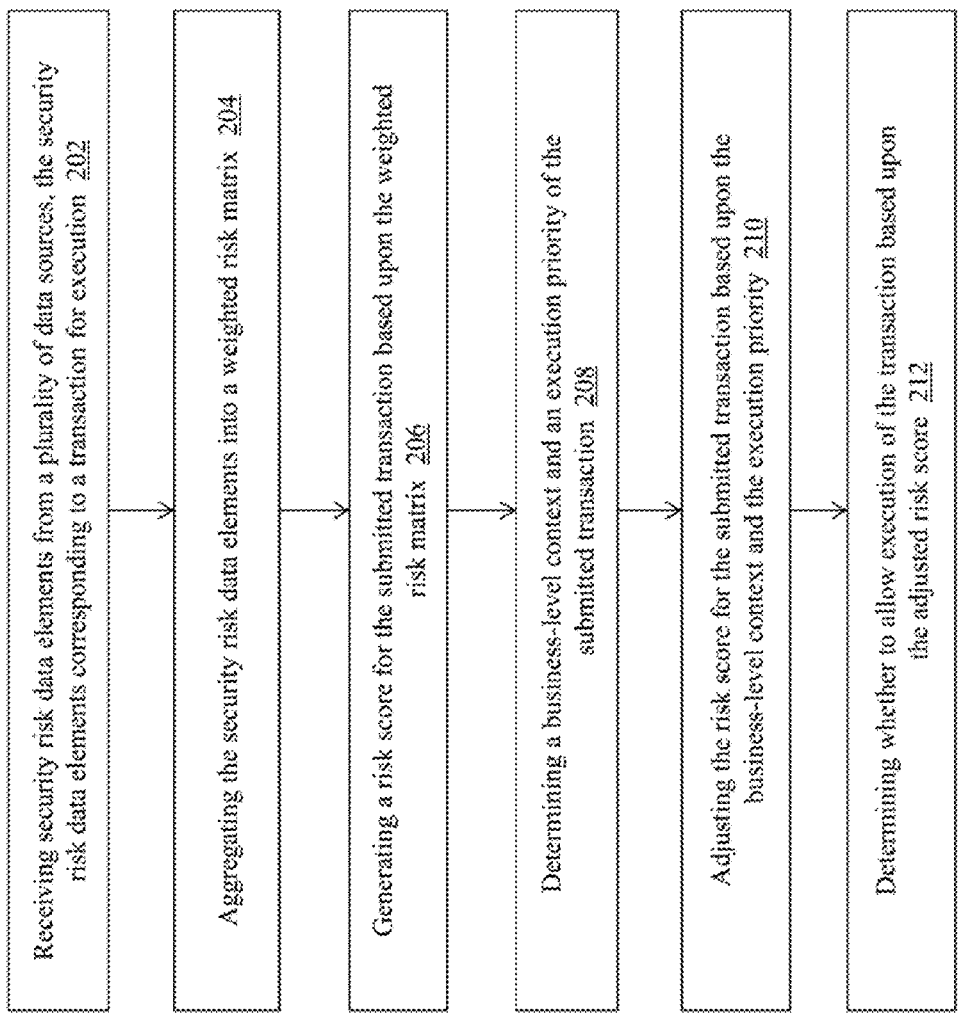
FIG. 2 is a flow diagram of a method for transaction-based security risk aggregation and analysis.

FIG. 2 is a flow diagram of a method for transaction-based security risk aggregation and analysis, using the system 100 of FIG. 1. The risk aggregation and analysis module 110 receives (202) security risk data elements from a plurality of data sources (e.g., sources 116a-116f) that correspond to a transaction for execution. As described above, the data sources 116a-116f provide data on a variety of physical aspects (e.g., attributes of the computing device that submitted the transaction, attributes of a known or expected user of the computing device), logical aspects (e.g., attributes of the transaction itself) and organizational aspects (e.g., attributes of the security risk level for a particular business unit, attributes of the risk policies implemented by the company) relating to a transaction submitted to a company's computing system.

In addition to the data feeds 116a-116f depicted in FIG. 1, the risk aggregation and analysis module 110 can also utilize data from other sources (e.g., database 108). Based upon the data received from the data feeds 116a-116f, for example, the module 110 can determine attributes of the transaction that can be sourced from internal data sources. In one example, the risk aggregation and analysis module 110 may receive device information (e.g., device ID, MAC address) for a particular device that submitted a transaction. Based upon the device information, the module 110 can determine a particular employee that is associated with the device and retrieve information about the employee from, e.g., the employee data feed or another data source—to be used in the subsequent processing and analysis steps.

The risk aggregation and analysis module 110 aggregates (204) the security risk data elements into a weighted risk matrix. FIG. 3 depicts an exemplary risk matrix generated by the risk aggregation and analysis module 110. As shown in FIG. 3, the module 110 determines a plurality of vulnerabilities (collectively, 302) associated with a particular transaction and assigns a weight (or points) to each vulnerability that is detected. The vulnerabilities can be associated with the software platform and/or hardware platform of the remote device (e.g., device 102) being used to access the company's system and submit the transaction. For example, the remote device 102 may not have the latest operating system security patch installed—as reflected in vulnerability 302a. The module 110 can assign a higher risk weight to that vulnerability 302a (e.g., a weight of eight points). In another example, the module 110 determines that the user associated with the remote device 102 has administrator rights to the device—meaning that, for example, he can install software locally—as reflected in vulnerability 302b. The module 110 can assign a higher risk weight to that vulnerability 302b (e.g., ten points). In yet another example, the module 110 determines that the user associated with the remote device 102 has not completed a company-wide information technology training program—as reflected in vulnerability 302c. The module 110 can assign a higher risk weight to that vulnerability 302c (e.g., ten points).

Once the risk aggregation and analysis module 110 has determined the vulnerabilities 302 associated with a submitted transaction, the module 110 determines a threat (collectively, threats 304) associated with each vulnerability and assigns each threat a risk weight. For example, the threat 304a associated with the vulnerability of not having up-to-date operating system patches 302a is that a virus or malware could be affecting the remote device 102 and potentially be transferred to the company's system. As a result, the module 110 can assign a moderate risk weight to the threat (e.g., five points).

The risk weights assigned to the vulnerabilities 302 and the threats 304 can be determined by the module 110 using one or more risk policies or profiles configured by the company. As described previously, the risk policy data feed 116c can supply the module 110 with information relating to the company's definition of certain vulnerabilities and threats that may affect its computing systems. For example, a company may determine that the vulnerability 302a of not having up-to-date operating system patches is a lesser concern so the company can assign a lower weight to that vulnerability 302a. In another example, a company may determine that the vulnerability 302a is of foremost concern so the company can assign a higher weight.

In addition, it should be appreciated that the weights for the vulnerabilities 302 and threats 304 can be dependent upon the characteristics of the remote device 102 and/or the identity, job title, business unit, location, permission level, and other such factors of a known or expected user that is operating the remote device 102. In one example, the module 110 determines that the remote device 102 is connected via a company-internal network, so the module 110 assigns a lower risk weight to certain vulnerabilities (e.g., encryption). In another example, the module 110 determines that the remote device 102 is connected from a country on the opposite side of the world where the company has no offices or employees, the module 110 assigns a higher risk weight to vulnerabilities and/or threats.

In another example, if the module 110 determines that a user of the remote device 102 is an executive vice president and the company has established a risk policy allowing such employees to perform transactions with a higher risk tolerance, the module 110 can assign lower risk weights to the vulnerabilities 302 and/or threats 304—as compared to a junior employee that is restricted to accessing a limited set of company information. Of course, the company can maintain a uniform risk weight for certain vulnerabilities 302 and/or threats 304 regardless of the remote device 102 and/or employee.

Once the threats and associated weights are determined, the risk score generation module 112 then generates (204) a risk score for the submitted transaction based upon the weighted risk matrix provided by the risk aggregation and analysis module 110. As shown in FIG. 3, the risk score generation module 112 determines a risk (collectively, risks 306) associated with each vulnerability-threat combination. For example, the module 112 determines that the risk 306a associated with a threat of a virus or malware 304a due to the vulnerability of not having up-to-date operating system patching 302a is that the company may lose reputation and/or money (e.g., if a company system is down or has to be brought off-line due to the virus or if the customer data or transaction data is negatively affected due to the virus). The module 112 then calculates a risk score for the vulnerability-threat combination, e.g., by multiplying the vulnerability weight by the threat weight. For example, as presented in FIG. 3, the vulnerability 302a is assigned a weight of eight and the associated threat 304a is assigned a weight of five, resulting in a risk score 306a of forty for that vulnerability-threat combination.

It should be appreciated that the company may wish to configure the risk score calculation according to specific concerns or needs of the company as a whole, a particular business unit or division, or another component of the company. For example, management personnel of a business unit can configure the risk score calculation, including such items as the weights assigned to the threats and vulnerabilities and categorization of the risk, in order to tailor the risk score according to its business practices. The risk score generation module 112 can receive inputs (e.g., weights, categorizations) from such personnel to adjust the risk score calculation to achieve the customized risk score calculation.

Once the risk score generation module 112 has generated a risk score for each vulnerability-threat combination, the module 112 determines an overall risk score, e.g., by summing up the risk scores for each vulnerability-threat combination and then dividing the total by the number of vulnerability-threat combinations. As shown in FIG. 3, the overall risk score 310 is fifty—or the total risk score of four-hundred fifty (the sum of the risk scores for each vulnerability-threat combination) divided by nine (the number of vulnerability-threat combinations). The module 112 can compare the overall risk score 310 to a scale to determine a severity of the risk associated with the transaction based upon the vulnerabilities and threats (e.g., a risk score of one is low, while a risk score of one hundred is high). It should be appreciated that any number of algorithms and/or processes to generate the risk matrix and/or risk score can be utilized to perform the transaction-based security risk aggregation and analysis process described herein without departing from the scope of invention.

It should be appreciated that management personnel of the company and/or a particular business unit may want to override the overall risk score 310 or the comparison of the risk score to a scale, in order to customize the level of risk that the business unit can tolerate with respect to certain types of transactions or functions. For example, the personnel can adjust the scale, or provide a scale that is tailored to the business unit, which the module 112 uses to compare with the overall risk score 310. One business unit may have a higher tolerance for executing risky transactions, so the scale used to compare to the overall risk score may deem most transactions as low or medium risk. Alternatively, another business unit may be generally risk-averse, so the scale used to compare to the overall risk score may deem most transactions as high risk.

In another example, the personnel can override the overall risk score 310 altogether according to specific business practices of the company, business unit, and the like. For example, the module 112 can determine an overall risk score 310 for a particular transaction to be forty-five. However, one business unit may consider this transaction to be high risk, regardless of the specific circumstances and attributes. Therefore, the module 112 can receive inputs from management personnel to automatically set the overall risk score 310 to another value (e.g., ninety-five) for the transaction.

In some embodiments, the risk score generation module 112 determines (208) a business-level context and an execution priority of the submitted transaction. The business-level context includes the attributes of the transaction from a business perspective and the impact that the transaction will have on the company. For example, a trading transaction can involve multiple parties, financial instruments, accounts, and business units in multiple locations. The trade can involve the transfer of a certain number of shares that are assigned a particular monetary value. The trade can impact a plurality of internal computing systems that process the transaction. Any of these attributes can contribute to the business-level context of the transaction.

As a result, the company may want to adjust the risk score for certain types of transactions based upon the business-level context. For example, if the transaction involves a large amount of money and the company typically does not perform transactions in such large amounts, the company may prefer to increase the scrutiny of the transaction and adjust the risk score upward accordingly. On the other hand, if the transaction is between two of the company's largest clients that routinely engage in similar transactions, the company may prefer to adjust the risk score downward as it may feel more comfortable with allowing the transaction to execute. The business-level context can be customized according to any of the above-referenced attributes, according to the needs of the company.

The risk score generation module 112 also adjusts the risk score for the submitted transaction based upon an execution priority. The execution priority is based upon the importance of the transaction to the company as compared to other transactions. For example, a company may want to ensure that certain transactions submitted by one of its main business units are allowed to execute before other transactions and without a significant amount of monitoring or confirmation (perhaps because those transactions are the most profitable for the company). The module 112 can assign an execution priority to the transactions that flags the transactions for a more expedient level of processing, such as real-time execution of the transaction, so that the company's computing system will prioritize execution of the transaction over others (e.g., that may be queued for processing at a later time). Based upon the execution priority, the module 112 can determine that the priority of the transaction outweighs the potential security risk of the transaction, and adjusts the risk score for such transactions downward so that the transactions are likely to be allowed except in rare circumstances when the risk score is at an extremely high level. In some cases, the risk score generation module 112 can even determine, e.g., a profit level of the transaction and assign an execution priority based upon the profit level. The execution priority can be customized according to the needs of the company.

The risk score generation module 112 transmits the adjusted risk score to the risk remediation module 114, and the risk remediation module 114 determines (212) whether to allow execution of the transaction based upon the adjusted risk score. For example, the risk remediation module 114 can determine that the adjusted risk score for a transaction falls below a predetermined risk tolerance and allows the transaction to execute. In another example, the risk remediation module 114 can determine that the adjusted risk score for a transaction exceeds a predetermined risk tolerance and prevents the transaction from executing.

In some embodiments, the risk remediation module 114 can transmit instructions to other systems to prevent execution of the transaction. The risk remediation module 114 can also perform additional security procedures with respect to the transaction, such as diverting the transaction execution, and in some cases the user session, to a system that is configured for risk monitoring and does not affect the production environment. The risk remediation module 114 can also generate analyses and reports relating to the transaction for review by risk analysts at the company. In some embodiments, the risk score generation module 112 can transmit the overall risk score to the risk remediation module 114 without any further analysis of the transaction (e.g., determining a business-level context and execution priority of the transaction and adjusting the risk score, as described above).

In addition, the risk remediation module 114 can prioritize determination of execution and remediation of transactions that exceed a particular risk tolerance. For example, the module 114 can receive risk scores for (a) a large-scale financial transaction and (b) an email login request transaction. The module 114 can first determine whether to allow execution of the large-scale financial transaction before determining whether to allow the email login request transaction because the large-scale financial transaction, if allowed, would have a significant impact on the company's brokerage account.

The risk aggregation and analysis module 110, the risk score generation module 112, and the risk remediation module 114 can retrieve and/or store information in database 108 that can be used for future transaction analysis. For example, the modules 110, 112, 114 can process a transaction according to the techniques described above to generate a risk score and determine whether to allow the transaction. If, for example, the transaction was not allowed, the module 110, 112, 114 can leverage that decision in processing later transactions with the same or similar attributes. In this way, the modules 110, 112, 114 can use prior events to determine risk trends and predict future activity with respect to certain classes of transactions.

Figure 4:
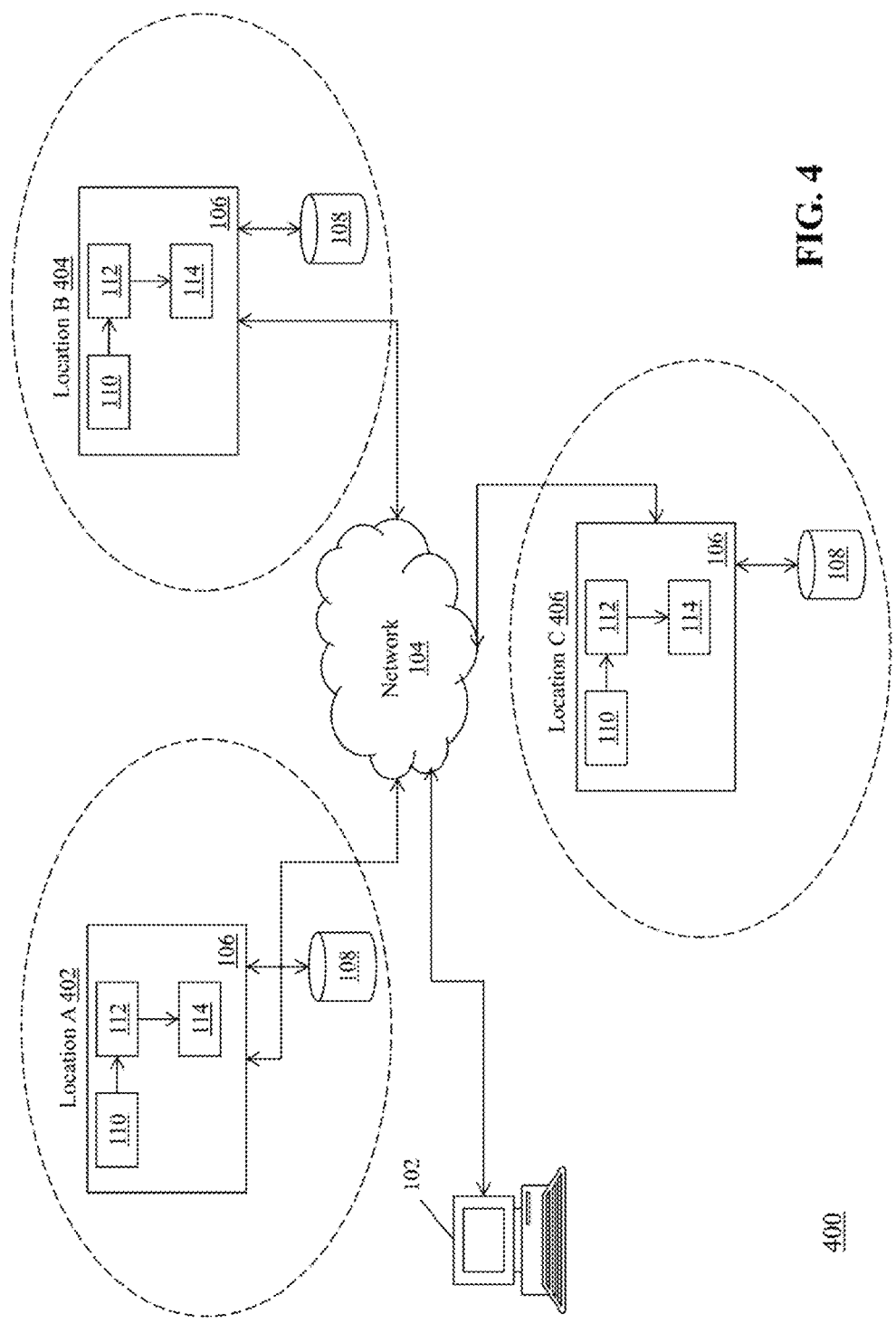
FIG. 4 is a block diagram of a networked system for transaction-based security risk aggregation and analysis.

The techniques may be implemented in a networked system 400 comprising multiple computing devices distributed across different locations, as shown in FIG. 4. Each of Location A 402, Location B 404 and Location C 406 includes the server computing device 106 having components 110, 112, 114 and the database 108 of FIG. 1, and the servers at locations 402, 404, and 406 are connected to each other via the network 104. The networked system of FIG. 4 enables distribution of the processing functions described herein across several computing devices and provides redundancy in the event that a computing device at one location is offline or inoperable. In some embodiments, client computing devices (e.g., device 102) in proximity to a particular location (e.g., Location A 402) access the networked system via the server 106 at that location.

Adaptive Controls

An additional capability of the systems and methods described herein is to analyze both internal and external environmental risk variables to determine a risk level of associated transactions and to, in some cases, utilize adaptive control mechanisms to account for the determined risk level and adjust the corresponding risk score and/or risk remediation plan. In this manner, transactions can be dynamically monitored and controlled to generate a specific response to the transaction risk, instead of only determining whether to allow or disallow a transaction. Also, the system 100 can be configured to continuously receive feedback regarding potential and actual transaction risk such that the system becomes a self-learning environment that is able to efficiently and dynamically adjust risk thresholds and trigger secondary actions based on the risk for a spectrum of different business units or technical environments within an organization.

Figure 5:
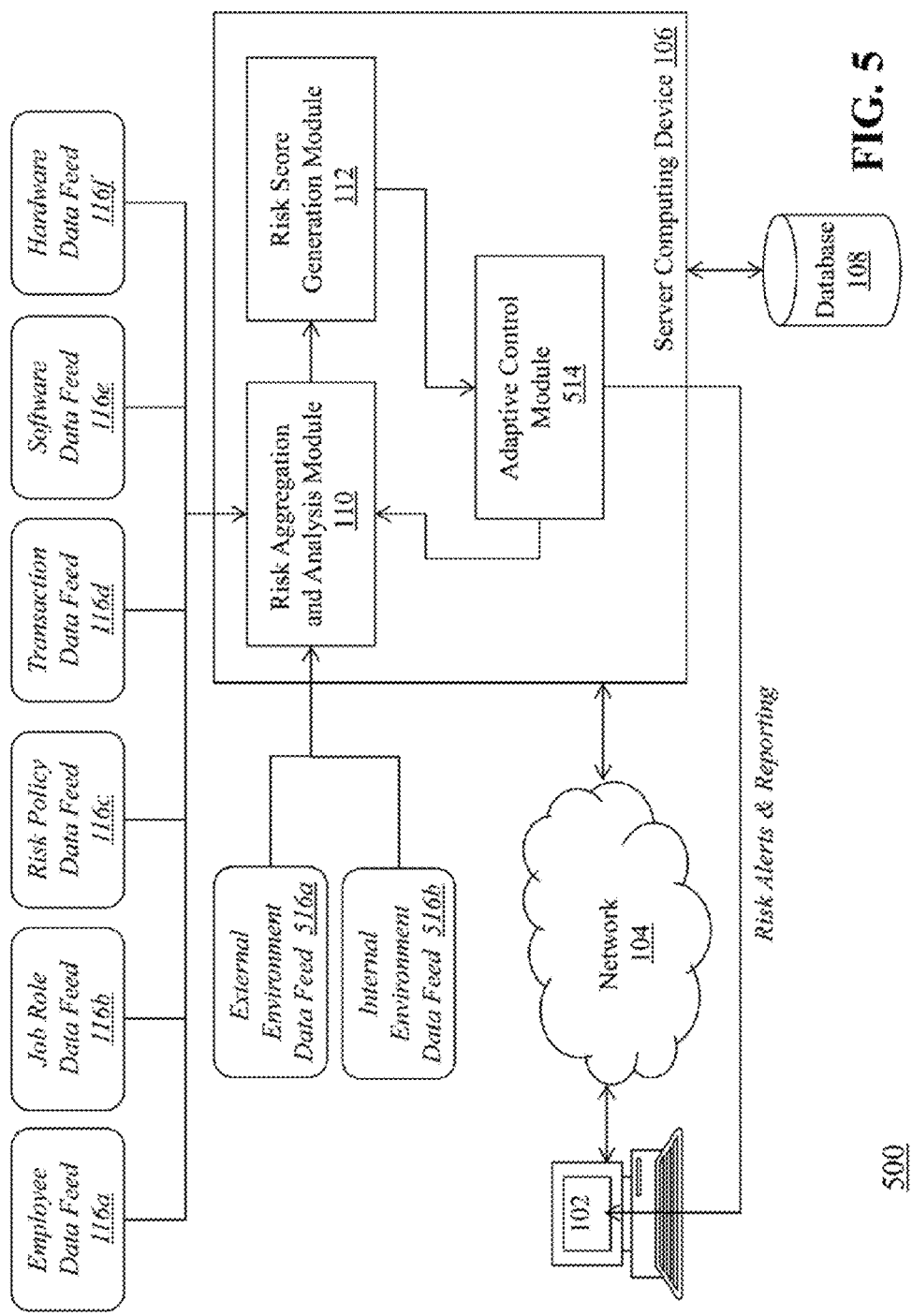
FIG. 5 is a block diagram of a system for transaction-based security risk aggregation, analysis, and adaptive control.

FIG. 5 is a block diagram of a system 500 for transaction-based security risk aggregation, analysis, and adaptive control, according to an embodiment of the invention. The system 500 includes client device 102, communications network 104, server computing device 106 coupled to database 108, several modules 110, 112, 514 included in the server computing device 106, and a plurality of data feeds 116a-116f and 516a-516b connected to server computing device 106. The elements 102, 104, 106, 108, 110, 112, and 116a-116f have been described above with respect to FIG. 1.

The server computing device 106 further includes an adaptive control module 514. The module 514 is a hardware and/or software module that resides on the server computing device 106 to perform functions associated with the transaction-based security risk aggregation, analysis, and adaptive control process described herein. In some embodiments, the functionality of the module 514 is distributed among a plurality of computing devices. It should be appreciated that any number of computing devices, arranged in a variety of architectures, resources, and configurations (e.g., cluster computing, virtual computing, cloud computing) can be used without departing from the scope of the invention. The exemplary functionality of the module 514 will be described in greater detail below.

The system 500 also includes an external environment data feed 516a and an internal environment data feed 516b that supply data to the server computing device 106 to be used in performing the transaction-based security risk aggregation, analysis, and adaptive control process described herein. The data feeds 516a-516b can provide data to the server computing device according to any of a number of different schedules (e.g., real-time, daily, weekly, monthly, etc.) It should be appreciated that other types of data feeds can be coupled to the server computing device 106 without departing from the scope of invention. In addition, it should be understood that although a single data feed for each data feed type is depicted in FIG. 5, any of the data feeds 516a-516b can comprise a plurality of separate or linked data feeds that make up the breadth of data provided to the server computing device 106 for a particular data feed type.

The external environment data feed 516a provides data relating to risk events and risk factors that occur in computing environments outside the control of the organization that operates and manages the enterprise computing system, of which system 500 is a part. Such risk events and risk factors can include, for example, cyber attacks against outside enterprise computing systems, fraudulent transactions submitted to outside enterprise computing systems, data breaches experienced by outside enterprise computing systems, and the like. The monitoring of such external risk events and factors provides important information for the organization to determine whether to change its risk profiles to account for or preempt the possibility that similar risks will affect the organization's computing systems.

In one example, a number of large banks may have recently experienced Distributed Denial of Service (DDoS) attacks or hacking attempts against their customer-facing account portal websites. The organization operating the system 500 is also a large bank but has not yet seen the same type of attacks against its account portal website. The external environment data feed 516a can transmit data to the risk aggregation and analysis module 110 that indicates the occurrence of such attacks and hacking attempts against entities that are similar to the organization. The risk aggregation and analysis module 110 can utilize the external environment data when determining risk scores for transactions that are being submitted to the organization's enterprise computing systems. In addition, the adaptive control module 514 can adjust the risk scores and the enterprise/business unit/computing system risk profile to account for the increased likelihood that similar types of security risks will impact the organization's enterprise computing systems.

The adaptive control module 514 can also determine dispositions for certain transactions based upon the external environment data and/or the risk profile as adjusted for the external environment. For example, if the organization's risk profile has changed to reflect a higher risk threshold in light of the recent cyber attacks and hacking attempts on other banks, subsequent transactions that come into the organization's computing systems via the customer-facing account portal may be subject to higher scrutiny by the system 500 and result in different dispositions that may have occurred previously when the risk threshold was lower. In some cases, the adaptive control module 514 can transmit alerts to employees such as IT managers, CIOs, and security personnel when a transaction is submitted that exceeds the risk threshold and exhibits characteristics similar to transactions seen in cyber attacks. Such alerts can prompt the relevant users to take corrective action with respect to the transaction.

In some cases, the adaptive control module 514 can initiate automated correction steps to mitigate the risk potential of allowing the transaction to proceed as normal. For example, the adaptive control module 514 can transfer the transaction to a secondary authentication system to apply additional security measures with respect to the transaction. The module 514 can request further authentication credentials (e.g., a token) from the remote computing device that submitted the transaction. If the remote computing device responds with the proper credentials, the secondary authentication system can allow the transaction to proceed. If the remote computing device fails to respond with the proper credentials, the secondary authentication system can reject the transaction.

The internal environment data feed 516b provides data relating to risk events and risk factors that occur in computing environments within the control of the organization that operates and manages the enterprise computing system, of which system 500 is a part. Such risk events and risk factors can include, for example, abnormal communications from or to computing devices in the enterprise computing system, detection of unauthorized software within the enterprise computing system, and the like. The monitoring of such internal risk events and factors provides important information for the organization to determine whether to change its risk profiles to account for the potential and/or actual risks imposed by such transaction activity on the organization's computing systems.

In one example, the enterprise's computing nodes may be communicating with each other in an abnormal or unfamiliar pattern, such as when computing devices that had never communicated before are now connecting to each other and exchanging information, a network of computing devices exhibiting a large-scale increase in transaction activity that is unexpected, or detection of malware across many devices in the computing system. The risk aggregation and analysis module 110 can utilize the internal environment data when determining risk scores for transactions that are being submitted within the organization's enterprise computing systems. In addition, the adaptive control module 514 can adjust the risk scores and the enterprise/business unit/computing system risk profile to account for the increased likelihood that the transaction activity detected via the internal environment data may present a real risk to the organization's enterprise computing systems.

The adaptive control module 514 can also determine dispositions for certain transactions based upon the internal environment data and/or the risk profile as adjusted for the internal environment. For example, if the organization's risk profile has changed to reflect a higher risk threshold in light of the abnormal activity detected within its enterprise computing systems, subsequent transactions that are exchanged within the organization's computing systems may be subject to higher scrutiny by the system 500 and result in different dispositions that may have occurred previously when the risk threshold was lower. In some cases, the adaptive control module 514 can transmit alerts to employees such as IT managers, CIOs, and security personnel when a transaction is submitted that exceeds the risk threshold and exhibits characteristics similar to the abnormal transaction patterns detected previously. Such alerts can prompt the relevant users to take corrective action with respect to the transaction.

In some cases, the adaptive control module 514 can initiate automated correction steps to mitigate the risk potential of allowing the transaction to proceed as normal. For example, the adaptive control module 514 can transfer the transaction to a secondary authentication system to apply additional security measures with respect to the transaction. The module 514 can request further authentication credentials (e.g., a token) from the remote computing device that submitted the transaction. If the remote computing device responds with the proper credentials, the secondary authentication system can allow the transaction to proceed. If the remote computing device fails to respond with the proper credentials, the secondary authentication system can reject the transaction.

It should be appreciated that the system can also dynamically adjust the organization's risk thresholds and risk profiles downward if an existing internal and/or external environment risk event or factor has been resolved. For example, if the Department of Homeland Security had previously raised the nation's threat level to its highest value (e.g., Red), the system 500 received this information and adjusted the organization's risk thresholds and risk profiles to require, e.g., secondary authentication processing of all incoming transactions. At a later time, when the nation's threat level is reduced to Yellow, the system 500 can update the risk thresholds and risk profiles dynamically to eliminate the requirement of additional secondary authentication processing, or require such processing only for specific transactions instead of all transactions. Additionally, the system can transmit notifications to specific organization personnel to take actions to reduce the organization's, or certain business units', risk thresholds in light of the new threat level designation. In this manner, the system 500 automatically adapts to changing internal and external environment risk conditions and provides robust risk remediation and mitigation protections for transactions processed by the system.

The dispositions taken by the adaptive control module 514 can be used to provide feedback to the organization's risk profile(s) and to the analysis performed by the risk aggregation and analysis module 110. In some embodiments, the system can generate and refer to an environmental risk profile, which includes the risk threshold that the organization can tolerate based upon internal and/or external environmental risk factors.

For example, when the adaptive control module 514 has transferred a large number of transactions to a secondary authentication system and those transactions have been rejected, it may be indicative of a cyber attack or hacking attempt against the organization's enterprise systems (external), the wide-scale presence of malware within the enterprise computing systems (internal), or both. As a result, the adaptive control module 514 can update the organization's risk profile to include a higher risk threshold in light of the abnormal activity and also feed the information to the risk aggregation and analysis module 110. The module 110 then can apply the updated risk profile to subsequent transactions when generating the risk scores for those transactions. This feedback capability provides the advantage of converting the system 500 into a dynamic, self-learning environment where new risks can continually be evaluated against the system's knowledge of the current risk profile and risk environment.

Figure 6:
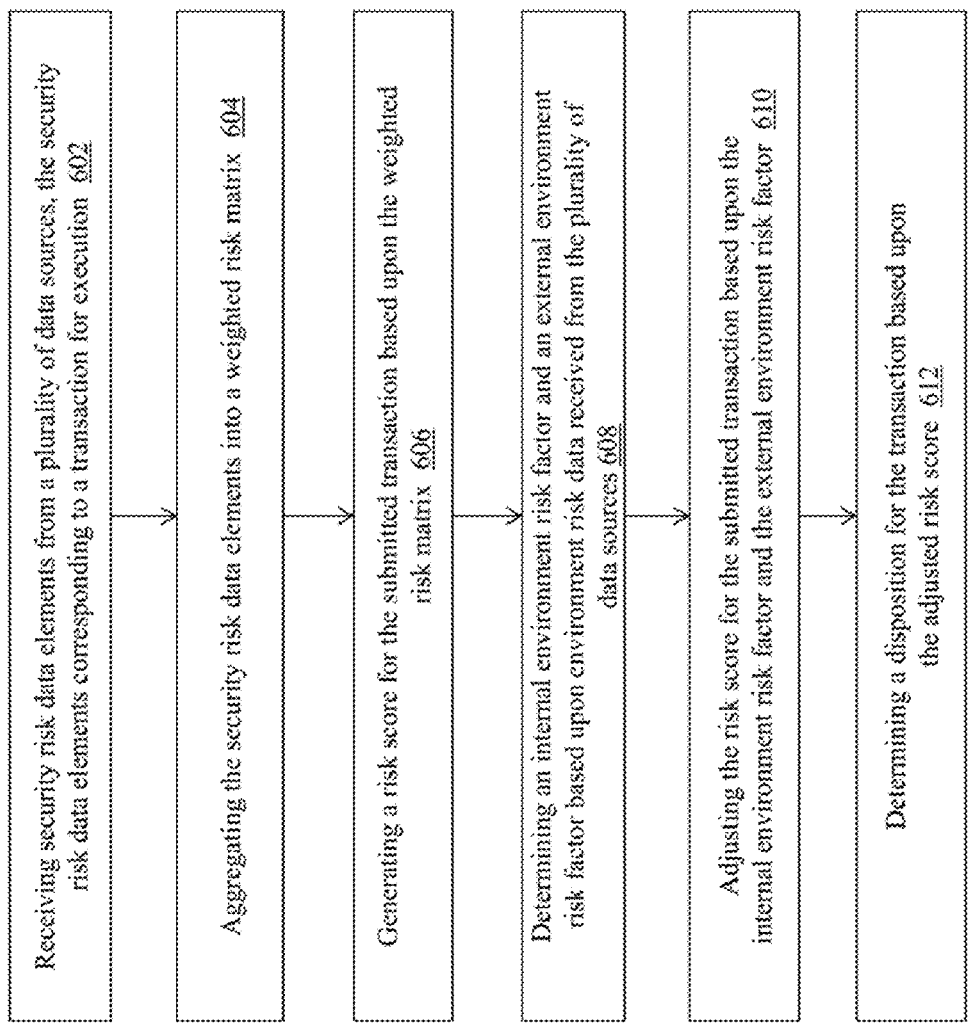
FIG. 6 is a flow diagram of a method for transaction-based security risk aggregation, analysis, and adaptive control.

FIG. 6 is a flow diagram of a method 600 for transaction-based security risk aggregation, analysis, and adaptive control, using the system 500 of FIG. 5. The risk aggregation and analysis module 110 receives (602) security risk data elements from a plurality of data sources (e.g., sources 116a-116f) that correspond to a transaction for execution.

The risk aggregation and analysis module 110 aggregates (604) the security risk data elements into a weighted risk matrix, as described above with respect to FIG. 3. Once the risk matrix is assembled, the risk score generation module 112 then generates (606) a risk score for the submitted transaction based upon the weighted risk matrix provided by the risk aggregation and analysis module 110 (as described in detail above).

In some embodiments, the risk score generation module 112 determines (608) an internal environment risk factor and an external environment risk factor based upon data received from the internal environment data feed 516a and the external environment data feed 516b. The risk score generation module 112 adjusts (610) the risk score for the submitted transaction based upon internal environment risk factor and the external environment risk factor.

The risk score generation module 112 transmits the adjusted risk score to the adaptive control module 514, and the adaptive control module 514 determines (612) a disposition for the transaction based upon the adjusted risk score. As mentioned previously, the adaptive control module 514 can determine whether to allow or deny the transaction. The adaptive control module 514 can also perform other dispositions for the transaction, including for example: diverting the transaction execution, and in some cases the user session, to a system that is configured for risk monitoring and does not affect the production environment, generate alerts and reports relating to the transaction for review by certain employees at the organization, transferring the transaction to a secondary authentication system, and the like.

The adaptive control module 514 can retrieve and/or store information in database 108 that can be used for future transaction analysis. For example, the system 500 can process a transaction according to the techniques described above to generate a risk score and determine a disposition for the transaction. If, for example, the transaction was not allowed, the adaptive control module 514 can leverage that decision in processing later transactions with the same or similar attributes. The adaptive control module 514 can also adjust the organization's risk profile and risk threshold based upon this information, and feed the information back into the other modules 110, 112 in the system for enhanced self-learning capabilities. In this way, the system 500 can use prior events to determine risk trends and predict future activity with respect to certain classes of transactions.

Figure 7:
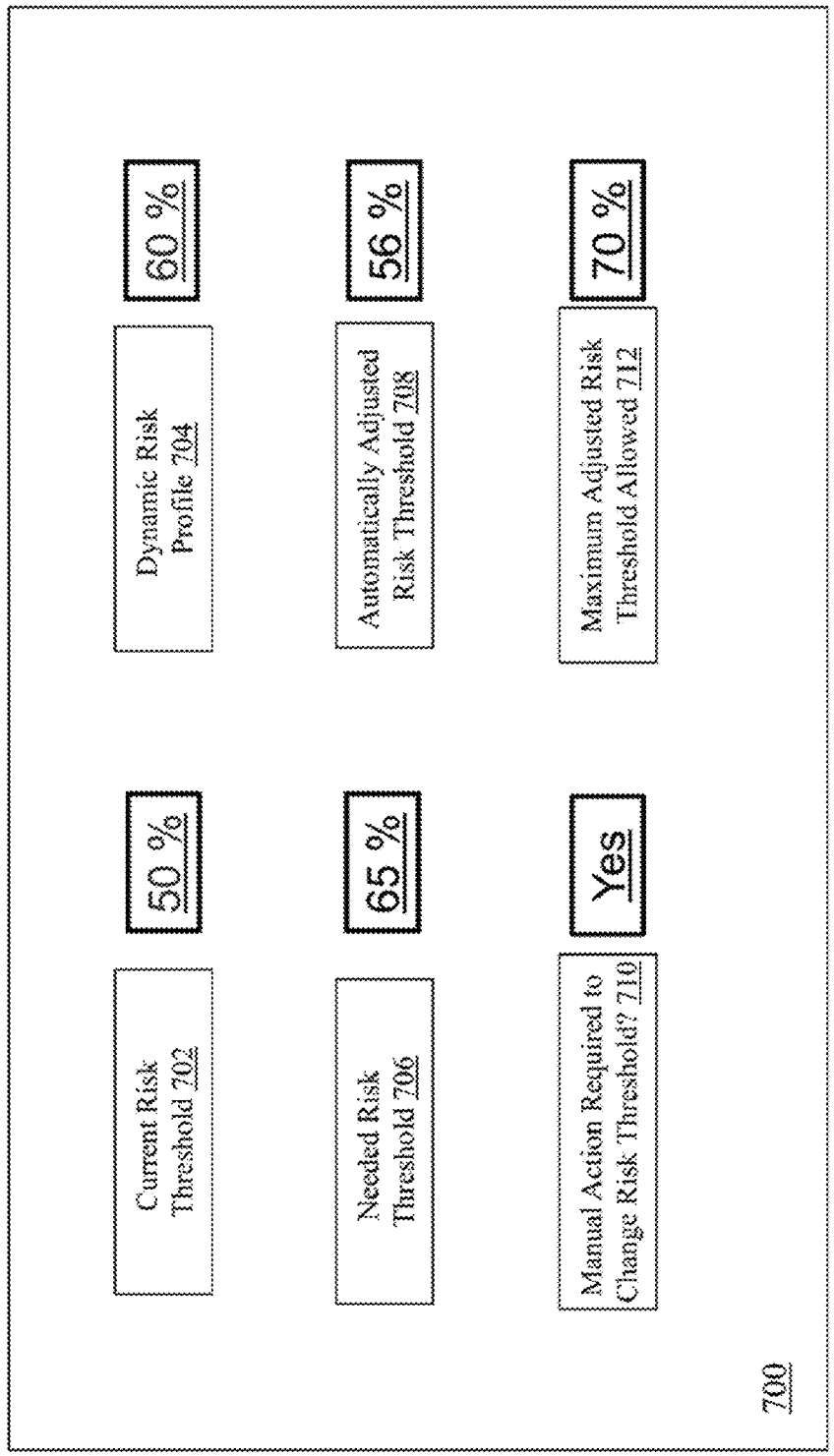
FIG. 7 is an exemplary user dashboard for presenting and analyzing the risk profile and risk threshold of an organization.

The dynamic adjustment of the risk profile(s) and the continuous analysis of incoming data to determine the presence of risks to the enterprise computing systems can also be leveraged to provide useful tools to system operators and managers when controlling the risk tolerances and thresholds for the organization. FIG. 7 is an exemplary user dashboard 700 for presenting and analyzing the risk profile and risk threshold of an organization.

As shown in FIG. 7, the dashboard 700 includes the current risk threshold 702 for the organization (or business unit), the organization's dynamic risk profile 704, the needed risk threshold 706 for the organization, the automatically adjusted risk threshold 708 for the organization, an indicator 710 of whether manual action is needed to change the risk threshold to the needed threshold value, and the maximum adjusted risk threshold allowed 712 for the organization.

In some embodiments, the organization and/or individual business units within the organization can have their own individual risk profiles with selected risk thresholds that are tailored to the specific needs and tolerances of the business unit. As described previously, certain business units may have expectations to tolerate a higher level of risk than other business units within the same organization. The system can provide for recordation and tracking of these individualized risk profiles. In addition, the organization may impose a risk threshold range upon the individual business units, such that the risk thresholds within the various risk profiles of an organization conform to a specified range—e.g., no business unit may have a risk tolerance lower than 50% or higher than 85%. In another embodiment, the organization may require that the overall risk tolerance for the organization (that is, the aggregation of the individualized risk thresholds for business units) must reach a specified value or fall within a specified range. This would allow business units to maintain their individualized risk thresholds yet still keep the overall risk threshold for the organization to a desired value.

For example, the organization's current risk threshold 702 is 50%. However, the system 500 may determine that certain external and/or internal environment risk events and risk factors, along with transaction risk scoring and other factors, have resulted in the organization's dynamic risk profile 704 to be set to 60%. Therefore, to ensure that the organization can adequately account for and mitigate the potential risk, the needed risk threshold 706 for the organization is 65%, or 5% higher than the dynamic risk profile.

The dashboard indicates that the organization's automatically adjusted risk threshold 708 is 56% based upon remediation and mitigation actions taken by the modules of the server computing device 106. Because the automatically adjusted risk threshold does not reach the needed risk threshold, the dashboard indicates that manual action is required (710) to increase the risk threshold from 56% to 65%. Also, the dashboard provides that the maximum adjusted risk threshold allowed 712 is 70%—indicating that the organization feels some level of risk should be tolerated when processing transactions. It should be appreciated that the dashboard 700 can be presented on a computer display (e.g., coupled to client computing device 102) for analysis and adjustment by employees of the organization (e.g., IT personnel, CIO, risk analysts, and so forth).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A computerized method for transaction-based security risk aggregation and analysis, the method comprising:
    receiving, by a server computing device, security risk data elements from a plurality of data sources, the security risk data elements corresponding to a transaction submitted by a remote computing device to the server computing device for execution;
    aggregating, by the server computing device, the security risk data elements into a weighted risk matrix;
    generating, by the server computing device, a risk score for the submitted transaction based upon the weighted risk matrix;
    determining, by the server computing device, an internal environment risk factor comprising analyzing a first set of other transactions submitted within a first enterprise computing system in which the server computing device is located to determine whether the first set of other transactions comprise one or more of abnormal communications from or to computing devices in the enterprise computing system or execution of unauthorized software within the first enterprise computing system;
    determining, by the server computing device, an external environment risk factor comprising analyzing a second set of other transactions submitted from a second enterprise computing system that is external to the first enterprise computing system to determine whether the second set of other transactions comprise one or more of cyber attacks against the second enterprise computing system, fraudulent transactions submitted to the second enterprise computing system, or data breaches experienced by the second enterprise computing system;
    adjusting, by the server computing device, the risk score for the submitted transaction based upon the internal environment risk factor and the external environment risk factor;
    determining, by the server computing device, a disposition for the transaction based upon the adjusted risk score;
    storing, by the server computing device, the security risk data elements, the internal environment factor, the external environment factor, and the adjusted risk score in a database; and
    using, by the server computing device, the stored security risk data elements, the internal environment factor, the external environment factor, and the adjusted risk score to determine a disposition for a future transaction.

2. The method of claim 1, wherein the disposition for the transaction includes transferring the transaction to a secondary authentication system.

3. The method of claim 2, wherein the secondary authentication system requests authentication credentials from the remote computing device that submitted the transaction.

4. The method of claim 1, wherein the disposition for the transaction includes holding the transaction in a queue and transmitting a notification to another computing device requesting authorization for the transaction.

5. The method of claim 1, further comprising
    comparing, by the server computing device, the adjusted risk score against a predefined risk threshold; and
    determining, by the server computing device, a disposition for the transaction based upon the comparison.

6. The method of claim 5, further comprising
    analyzing, by the server computing device, historical risk data associated with the transaction if the adjusted risk score exceeds the predefined risk threshold; and
    adjusting, by the server computing device, the predefined risk threshold based upon the historical risk data so that the adjusted risk score falls below the predefined risk threshold.

7. The method of claim 5, further comprising
    requesting, by the server computing device, authorization to override the predefined risk threshold from another computing device; and adjusting, by the server computing device, the predefined risk threshold based upon the requested authorization so that the adjusted risk score falls below the predefined risk threshold.

8. A system for transaction-based security risk aggregation and analysis, the system comprising a server computing device configured to:
- receive security risk data elements from a plurality of data sources, the security risk data elements corresponding to a transaction submitted by a remote computing device to the server computing device for execution;
- aggregate the security risk data elements into a weighted risk matrix;
- generate a risk score for the submitted transaction based upon the weighted risk matrix;
- determine an internal environment risk factor comprising analyzing a first set of other transactions submitted within a first enterprise computing system in which the server computing device is located to determine whether the first set of other transactions comprise one or more of abnormal communications from or to computing devices in the enterprise computing system or execution of unauthorized software within the first enterprise computing system;
- determine an external environment risk factor comprising analyzing a second set of other transactions submitted from a second enterprise computing system that is external to the first enterprise computing system to determine whether the second set of other transactions comprise one or more of cyber attacks against the second enterprise computing system, fraudulent transactions submitted to the second enterprise computing system, or data breaches experienced by the second enterprise computing system;
- adjust the risk score for the submitted transaction based upon the internal environment risk factor and the external environment risk factor;
- determine a disposition for the transaction based upon the adjusted risk score;
- store the security risk data elements, the internal environment factor, the external environment factor, and the adjusted risk score in a database; and
- use the stored security risk data elements, the internal environment factor, the external environment factor, and the adjusted risk score to determine a disposition for a future transaction.

9. The system of claim 8, wherein the disposition for the transaction includes transferring the transaction to a secondary authentication system.

10. The system of claim 9, wherein the secondary authentication system requests authentication credentials from the remote computing device that submitted the transaction.

11. The system of claim 8, wherein the disposition for the transaction includes holding the transaction in a queue and transmitting a notification to another computing device requesting authorization for the transaction.

12. The system of claim 8, further comprising
- comparing, by the server computing device, the adjusted risk score against a predefined risk threshold; and
- determining, by the server computing device, a disposition for the transaction based upon the comparison.

13. The system of claim 12, further comprising
- analyzing, by the server computing device, historical risk data associated with the transaction if the adjusted risk score exceeds the predefined risk threshold; and
- adjusting, by the server computing device, the predefined risk threshold based upon the historical risk data so that the adjusted risk score falls below the predefined risk threshold.

14. The system of claim 12, further comprising
- requesting, by the server computing device, authorization to override the predefined risk threshold from another computing device; and
- adjusting, by the server computing device, the predefined risk threshold based upon the requested authorization so that the adjusted risk score falls below the predefined risk threshold.

15. A computer program product, tangibly embodied in a non-transitory computer readable storage device, for transaction-based security risk aggregation and analysis, the computer program product including instructions operable to cause a server computing device to:
- receive security risk data elements from a plurality of data sources, the security risk data elements corresponding to a transaction submitted by a remote computing device to the server computing device for execution;
- aggregate the security risk data elements into a weighted risk matrix;
- generate a risk score for the submitted transaction based upon the weighted risk matrix;
- determine an internal environment risk factor comprising analyzing a first set of other transactions submitted within a first enterprise computing system in which the server computing device is located to determine whether the first set of other transactions comprise one or more of abnormal communications from or to computing devices in the enterprise computing system or execution of unauthorized software within the first enterprise computing system;
- determine an external environment risk factor comprising analyzing a second set of other transactions submitted from a second enterprise computing system that is external to the first enterprise computing system to determine whether the second set of other transactions comprise one or more of cyber attacks against the second enterprise computing system, fraudulent transactions submitted to the second enterprise computing system, or data breaches experienced by the second enterprise computing system;
- adjust the risk score for the submitted transaction based upon the internal environment risk factor and the external environment risk factor;
- determine a disposition for the transaction based upon the adjusted risk score;
- store the security risk data elements, the internal environment factor, the external environment factor, and the adjusted risk score in a database; and
- use the stored security risk data elements, the internal environment factor, the external environment factor, and the adjusted risk score to determine a disposition for a future transaction.

* * * * *